United States Patent
Magnouloux

(10) Patent No.: US 10,390,660 B2
(45) Date of Patent: Aug. 27, 2019

(54) METHOD FOR PRODUCING A HANDLE SUBASSEMBLY FOR A COOKING VESSEL

(71) Applicant: SEB S.A., Ecully (FR)

(72) Inventor: Guy Magnouloux, Epagny (FR)

(73) Assignee: SEB S.A., Ecully (FR)

( * ) Notice: Subject to any disclaimer, the term of this patent is extended or adjusted under 35 U.S.C. 154(b) by 367 days.

(21) Appl. No.: 15/290,196

(22) Filed: Oct. 11, 2016

(65) Prior Publication Data

US 2017/0099995 A1   Apr. 13, 2017

(30) Foreign Application Priority Data

Oct. 12, 2015  (FR) ..................... 15 59692

(51) Int. Cl.
| | |
|---|---|
| *H05B 6/12* | (2006.01) |
| *A47J 45/06* | (2006.01) |
| *A47J 37/10* | (2006.01) |
| *A47J 45/07* | (2006.01) |
| *A47J 45/08* | (2006.01) |

(52) U.S. Cl.
CPC .......... *A47J 45/068* (2013.01); *A47J 37/106* (2013.01); *A47J 45/061* (2013.01); *A47J 45/071* (2013.01); *A47J 45/08* (2013.01)

(58) Field of Classification Search
CPC ........ A47J 45/061; A47J 45/068; A47J 45/07; A47J 45/071; A47J 45/08; A47J 37/105; A47J 37/106; A47J 37/108
USPC .... 219/621, 627, 438; 374/141–156, E1.018
See application file for complete search history.

(56) References Cited

U.S. PATENT DOCUMENTS

| | | | |
|---|---|---|---|
| 5,441,344 A * | 8/1995 | Cook, III | ................ A47J 43/28 374/141 |
| 7,157,675 B2 | 1/2007 | Imura | |
| 9,955,529 B2 * | 4/2018 | Baarman | ............... A47J 27/002 |
| 2001/0032546 A1 | 10/2001 | Sharpe | |

FOREIGN PATENT DOCUMENTS

| | | | |
|---|---|---|---|
| DE | 202004009968 U1 | 9/2004 | |
| EP | 1591049 A1 | 11/2005 | |
| WO | 2004095994 A1 | 11/2004 | |
| WO | WO 2004/095994 A1 * | 11/2004 | ............. A47J 27/62 |
| WO | 2008119207 A1 | 10/2008 | |

* cited by examiner

*Primary Examiner* — Hung D Nguyen
(74) *Attorney, Agent, or Firm* — The Webb Law Firm

(57) ABSTRACT

Provided is a method for producing a handle subassembly made to be mounted to a body (2) to form a cooking vessel (1), said subassembly including a handle (20), a sensor (30), particularly a temperature sensor, equipped with at least one flexible insulated conducting element (31, 32) which is connected to a connector (17) of a control circuit (28), said subassembly including a receiving area (49) for the conducting element (31, 32) a part of which (49*b*) is disposed in the handle (20).

17 Claims, 3 Drawing Sheets

METHOD FOR PRODUCING A HANDLE SUBASSEMBLY FOR A COOKING VESSEL

CROSS-REFERENCE TO RELATED APPLICATION

This application claims priority to French Patent Application No. 1559692 filed Oct. 12, 2015, the disclosure of which is hereby incorporated in its entirety by reference.

FIELD OF THE INVENTION

The present invention relates to a method for producing a handle subassembly made to be mounted on a body to form a cooking vessel, more particularly a handle subassembly comprising a temperature sensor. The invention also relates to a handle subassembly and to a cooking vessel comprising the handle subassembly resulting from such a method. The cooking vessel is made to be placed on a cooktop, burner or the like for cooking food, for example a skillet, saucepan, stockpot, or pressure cooker.

DESCRIPTION OF RELATED ART

There is a method known from the document DE202004009968 for producing a handle subassembly made to be mounted to a body to form a cooking vessel, the subassembly comprising a handle and a temperature sensor equipped with two insulated conducting elements that are connected to a connector of a control circuit, the subassembly comprising a receiving area for the conducting elements, a part of which is disposed in the handle.

The conducting elements are formed by flexible wires. The conducting elements comprise a first part disposed in the receiving area and a second free part to which the sensor is connected. When the handle subassembly is mounted on the body, the second free flexible part must be carefully positioned and maintained, particularly when the handle is screwed into place, so that the conducting elements are not pinched.

Thus, the attention of the person doing the mounting must be sustained, and there is a substantial risk of the conducting elements being pinched, which can cut off the power to one or both conducting elements. Consequently, the cooking vessel may no longer have the functionalities provided by the sensor.

The object of the present invention is to overcome the aforementioned disadvantages and to propose a method for producing a handle subassembly that is simple and economical to implement.

Another object of the invention is to propose a handle subassembly equipped with a sensor, mounted in its entirety to a cooking vessel that offers reliable, repeatable, and long-lasting operation.

SUMMARY OF THE INVENTION

These objects are achieved with a method for producing a handle subassembly made to be mounted to a body to form a cooking vessel, said subassembly comprising a handle, a sensor, particularly a temperature sensor, equipped with at least one flexible insulated conducting element which is connected to a connector of a control circuit, said subassembly comprising a receiving area for the conducting element, a part of which is disposed in the handle, characterized in that it successively comprises the following steps:

a) Positioning and tensioning the conducting element inside the receiving area by exerting traction on the connector and/or on the conducting element after having placed said conducting element in a braking device disposed in the handle, which braking device allows the conducting elements to move in the direction of the traction when the tractive force exceeds a predetermined threshold, b) Inserting the connector and/or the conducting element into the handle, the handle comprising a receiving housing in which a residual part of the conducting element is disposed so as to form at least one loop, the braking device then preventing the conducting element from moving in the direction opposite the direction of the traction during the formation of the loop.

Thus, the flexible conducting element is tensioned inside the receiving area, which is designed so that the position of the flexible conducting element is fixed once it is tensioned. Consequently, the person who mounts the handle subassembly on the body does not have to worry about the position of the conducting element.

Advantageously, the braking device comprises a silicone stop equipped with a calibrated slot, the conducting element being disposed in the slot.

Making the stop from silicone makes it possible to obtain a flexible part. The slot has a calibrated width smaller than the width of the conducting element, which can for example be a diameter if the conducting element is round. Thus, the friction on the conducting element inside the slot maintains the conducting element in position as long as the tractive force on the conducting element does not exceed a predetermined threshold. Advantageously, the stop is disposed in the handle in order to maintain the width of the slot.

Preferably, the handle extends in a longitudinal direction, the part of the receiving area for the conducting element disposed in the handle extending mainly in the longitudinal direction and the slot being aligned with the part of the receiving area, and the tractive force on the conducting element exerted in step a) is applied in the longitudinal direction.

Thus, the tensioning of the conducting element allows it to be placed in the part of the receiving area disposed in the handle, the slot that maintains the conducting element being aligned with the part of the receiving area.

Preferably, the force for pushing the residual part of the conducting element into the receiving housing is applied in the longitudinal direction.

Thus, once the conducting element is tensioned inside the receiving area and held in place by the braking device, the residual part is pushed into the receiving housing in the longitudinal direction. The conducting element is dimensioned so as to bend under the application of a pushing force less than the predetermined threshold of the tractive force of the braking device, which allows the conducting element to be moved.

Advantageously, the handle has a free end which comprises an opening for receiving the connector, the connector being mounted in the longitudinal direction so as to push the residual part of the conducting element into the receiving housing.

Advantageously, the handle includes a cover and the method includes the following step prior to step a):

c) mounting the cover on the handle, said cover closing the part of the receiving area for the conducting element disposed in the handle and/or maintaining the braking device in position.

Thus, the cover serves two functions: closing the part of the receiving area for the conducting element disposed in the handle and maintaining the braking device in position, which is particularly economical.

Preferably, the handle subassembly includes a support comprising a first end mounted to the handle and a second end to which the sensor is mounted, the support forming a part of the receiving area for the conducting element, and the method includes the following steps prior to step a):
- placing the support on the handle
- placing the sensor on the support
- arranging the conducting element in the part of the receiving area.

Thus, the handle subassembly includes a rigid support that makes it possible to position the sensor inside the space in a known and repeatable way. During the step for tensioning the conducting element, the position of the flexible conducting element is simultaneously fixed in the part of the receiving area for the conducting element formed in the support, and in the part of the receiving area for the conducting element formed in the handle. Once the position of the components of the handle subassembly is fixed, particularly that of the conducting element, the subassembly can be easily mounted on the body.

In a particularly advantageous way, from a set of common components, i.e. the handle, the sensor, the conducting element, the connector, the braking device, and the cover, it is possible to produce a family of handle subassemblies made to be mounted on a family of bodies, for example of different sizes, using a specific support for each body. The specific support makes it possible to adapt the position of the sensor relative to the position of the handle, which can be different for each body size.

It is thus possible to produce a standard handle pre-subassembly for a family of cooking vessels and to customize it just before it is mounted to the support that is adapted to the size of the body.

The conducting element of the subassembly is therefore long enough to be mounted on the largest support in a family. The receiving housing is large enough to contain the residual part of the conducting element when it is mounted on the smallest support in the family.

Advantageously, the support is made from a metal material, particularly an austenitic non-ferromagnetic stainless steel.

The support made from a metal material is adapted to withstand high temperatures, particularly in proximity to the bottom of the body. A support made of austenitic non-ferromagnetic stainless steel makes it possible, when the cooking recipient is used with an induction heating means, to obtain a support that does not couple with the induction heating means.

Advantageously, the sensor and a part of the conducting element are encapsulated in a tubular metal sheath, the support comprising two tabs forming a receiving housing for the tubular sheath, and the method includes, in the step for placing the sensor on the support, an operation for forcibly inserting the tubular sheath into the receiving housing, the two mounting tabs having a spring effect that retains the tubular sheath on the support.

This arrangement makes it possible to mount the sensor on the support without adding any additional parts, which is particularly economical.

Preferably, the part of the receiving area for the conducting element is formed by a part for retaining the conducting element having a substantially constant cross section, particularly in the shape of a flattened U, and by tabs for retaining the conducting element, and the method includes, in the step for arranging the conducting elements in the part of the receiving area, an operation for folding the tabs so as to close the U shape and form the part of the receiving area.

This arrangement makes it possible to produce the part of the receiving area for the conducting element simply and economically, particularly when the support is made from a metal strip, cut out so as to include the tabs and stamped to form a U shape.

The invention also relates to a handle subassembly made to be mounted to a body to form a cooking vessel, said subassembly comprising a handle, a sensor, particularly a temperature sensor, equipped with at least one flexible insulated conducting element which is connected to a connector of a control circuit, the subassembly comprising a receiving area for the conducting element, a part of which is disposed in the handle, the subassembly being produced by the method described above.

The invention also relates to a cooking vessel comprising a handle subassembly mounted on a body, said subassembly comprising a handle, a sensor, particularly a temperature sensor, equipped with at least one flexible insulated conducting element which is connected to a connector of a control circuit, said subassembly comprising a receiving area for the conducting element, a part of which is disposed in the handle, said body comprising a lateral wall and a bottom in which is disposed a receiving housing for the sensor, the handle being mounted on the body by mounting means, the handle subassembly corresponding to the handle subassembly described above.

Thus, the cooking vessel results from the mounting of the handle subassembly on the body, particularly from the placement of the sensor into its housing and the mounting of the handle on the body.

Preferably, the means for mounting the handle on the body comprise a lug welded to the body, said lug cooperating with a housing inside the handle.

Preferably, the cookware item is a skillet, saucepan, stockpot, or pressure cooker.

BRIEF DESCRIPTION OF THE INVENTION

The invention will be better understood by reviewing the embodiments used as nonlimiting examples and illustrated in the attached figures, in which.

DETAILED DESCRIPTION OF THE INVENTION

It should be noted that in this document, the terms "horizontal," "vertical," "lower," "upper," "longitudinal," "transverse," "top," and "bottom" used to describe the cooking vessel refer to this cooking vessel during use, when it is positioned in a horizontal plane.

Figure 1:
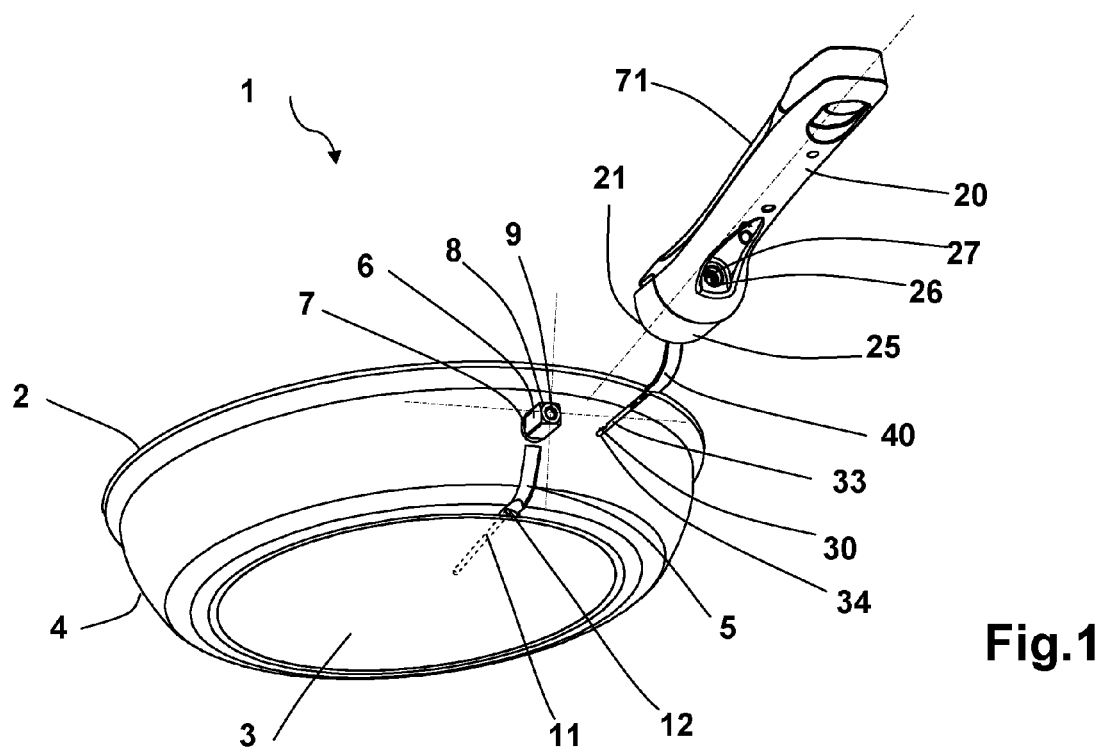
FIG. 1 illustrates an exploded perspective view of a cooking vessel according to a particular embodiment of the invention.
Figure 2:
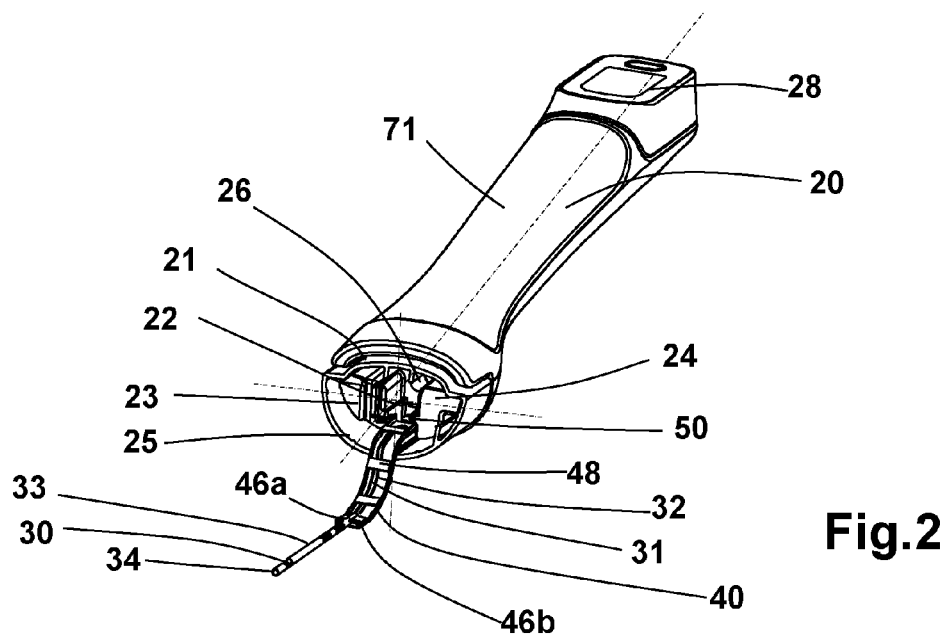
FIG. 2 illustrates a perspective view of the handle subassembly of the cooking vessel of FIG. 1.

As may be seen in FIGS. 1 and 2, a cooking vessel 1 comprises a body 2 comprising a bottom 3 and a lateral wall 4. The body 2 is made of aluminum, for example by the stamping of a blank or by a casting operation. The bottom 3 has a thickness inside which is disposed a receiving housing 11 for a sensor 30. The receiving housing 11 forms a tunnel which includes an opening 12 in the lateral wall 4 and which extends radially from this opening 12 toward the center of the bottom 3.

The cooking vessel 1 comprises a handle 20 which extends radially to the body 2 in a longitudinal direction. The handle 20 is disposed on the lateral wall 4 of the body 2 by mounting means 6, 22. The body 2 includes a part of the mounting means formed by a welded lug 6. The lug 6 has the overall shape of a rectangular parallelepiped, which has a first end 7 adapted to be mounted to the body 2, and a second end 8 comprising a threaded blind hole 9.

The handle 20 comprises an end 21 equipped with a part of the mounting means which is formed by a receiving housing 22 for the lug 6. The end 21 of the handle 20 includes two protuberances 23, 24 and a collar 25 surrounding the two protuberances 23, 24 which form the receiving housing for the lug 6. The end 21 of the handle 20 comprises a flanged through hole 26, formed in the extension of the housing 22. The hole 26 is made to receive a screw 27 capable of cooperating with the threaded blind hole 9 of the lug 6.

Figure 3:
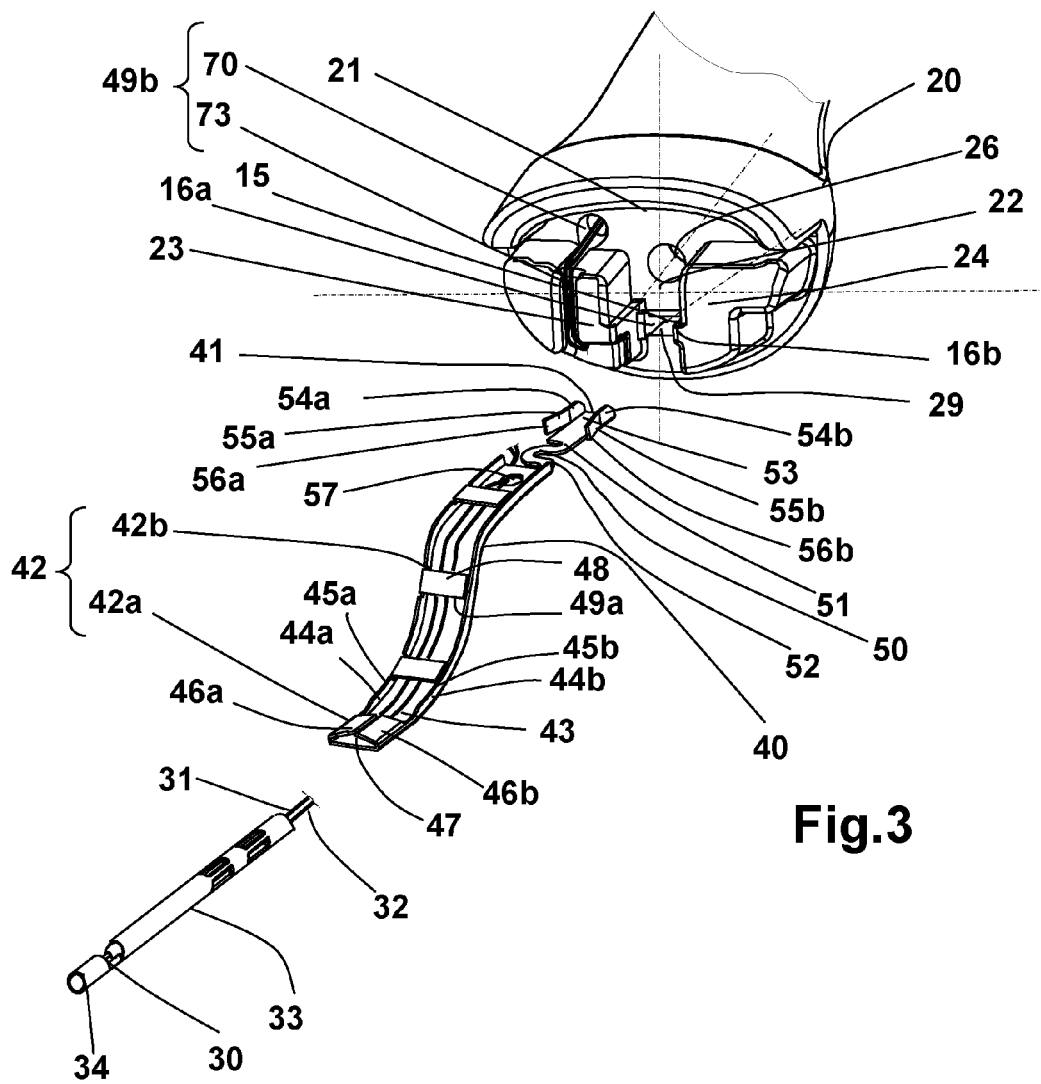
FIG. 3 illustrates a detailed exploded perspective view of the handle subassembly of FIG. 2.

As may be seen in FIG. 3, the temperature sensor 30 can be formed by an NTC thermistor or a thermocouple. NTC is understood to mean Negative Temperature Coefficient. The temperature sensor 30 is equipped with two insulated conducting elements 31, 32, which are disposed in a tubular stainless steel sheath 33, sealed at one end 34. The temperature sensor 30 is positioned at the bottom of the tubular sheath 33, near the sealed end 34. The tubular sheath 33 is adapted to be completely inserted into the receiving housing 11 so that the sensor 30 is maintained in a tightly fitted position, practically without play. The conducting elements 31, 32 are electrically connected to a control circuit 28 (FIG. 2) capable of processing the amplitude measured by the temperature sensor. The control circuit 28 is disposed in the handle 20 and can include, for example processing and display means and/or means for communicating with a heating means.

According to FIG. 3, the cooking vessel 1 comprises a support 40 comprising, at a first end, a mounting part 41 capable of cooperating with a receptacle 29 disposed at the end 21 of the handle 20. The receptacle 29 has a parallelepiped shape and includes a rectangular opening 15. The receptacle 29 is disposed below the housing 22 for receiving the lug 6. The support 40 includes a retaining part 42 for the tubular sheath and the conducting elements. The retaining part 42 comprises a part 42a for retaining the tubular sheath 33 and a part 42b for retaining the conducting elements 31, 32. The retaining part 42a is disposed at a second end of the support 40.

The support 40 is made from a metal strip that is cut out and then shaped by stamping. The retaining part 42 for the tubular sheath and the conducting elements has a substantially constant cross section in the shape of a flattened U. The cross section has a flat surface 43 and two lateral edges 44a, 44b, each comprising a free end 45a, 45b.

The retaining part 42a for the tubular sheath 33 comprises two tabs 46a, 46b, which extend from the two free ends 45a, 45b of the lateral edges 44a, 44b above the flat surface 43 so as to form a receiving housing 47 for the tubular sheath 33. The two mounting tabs 46a, 46b have a spring effect that retains the tubular sheath 33 on the flat surface 43 of the support 40.

The retaining part 42b for the conducting elements 31, 32 includes tabs 48 that extend from the free end 45a of the lateral edge 44a above the flat surface 43 so as to form a part 49a of an area 49 for receiving the conducting elements 31, 32.

The support 40 includes a programmed deformation area 50 that is S-shaped. The S shape is connected by a first end 51 to the retaining part 42 for the tubular sheath and the conducting elements and by a second end 52 to the mounting part 41 of the support 40 that is connected to the handle 20. The S shape has a rectangular cross section.

Thus, the retaining part 42 for the tubular sheath and the conducting elements is movable relative to the handle 20, particularly in a substantially vertical direction, perpendicular to the plane in which the S shape is located.

The mounting part 41 of the support 40 has a flattened U-shaped cross section which comprises a flat surface 53 and two lateral edges 54a, 54b. The flattened U-shaped part of the mounting part 41 is dimensioned for being inserted into the receptacle 29 of the handle 20. Two flexible tongues 55a, 55b extend longitudinally from the two lateral edges 54a, 54b, toward the outside of the U. The support 40 includes a programmed deformation area formed by the flexible tongues 55a, 55b disposed opposite each other on the mounting part 41. The flexible tongues 55a, 55b have two free ends 56a, 56b, which cooperate with two opposing support surfaces 16a, 16b of the receptacle 29 of the handle 20. The flat surface 53 of the flattened U is located in the plane in which the S shape is located.

The mounting part 41 of the support 40 can move inside its receptacle 29 transversely to the longitudinal direction, in a substantially horizontal direction. Thus, the retaining part 42 for the tubular sheath and the conducting elements is movable relative to the handle 20 in a horizontal direction, perpendicular to the vertical direction.

The support 40 includes, in the flat surface 43, a perforation 57. The perforation 57 is disposed at the end of the retaining part 42b for the conducting elements 31, 32, near the programmed deformation area 50. The conducting elements 31, 32 are positioned in the perforation 57 so as to pass from the part 49a to a part 49b of the receiving area 49 for the conducting elements 31, 32.

The lateral wall 4 includes a groove 5 (FIG. 1) extending from the opening 12 of the receiving housing 11 for the sensor 30 to the top of the lateral wall just under the lug 6. The groove 5 is for receiving the support 40 once the tubular sheath 33 is inserted into the receiving housing 11.

Figure 4:
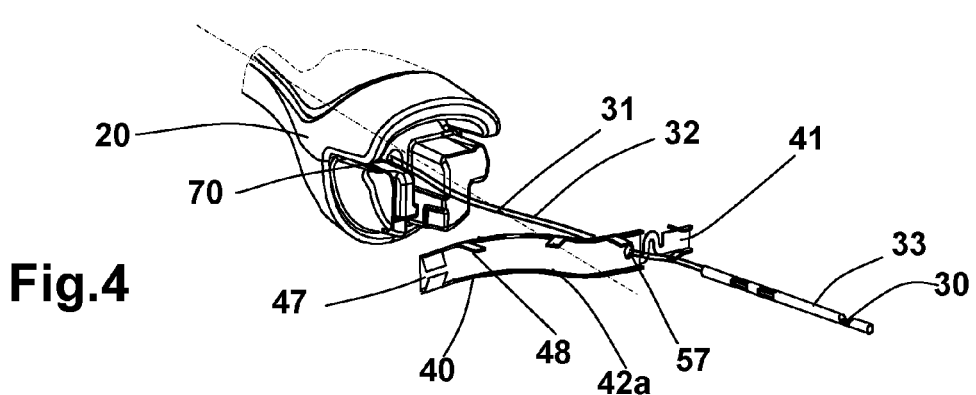
FIG. 4 illustrates a perspective view of the support, which is in an intermediate mounting position of the method for forming the handle subassembly of FIG. 2.

As may be seen in FIGS. 3 and 4, the conducting elements 31, 32 are disposed in the support 40 in the part 49a of the receiving area 49 and in the handle 20 in the part 49b of the receiving area 49 for the conducting elements 31, 32. The part 49b includes, at the end 21, a conduit 70 (FIG. 3) and a guide channel 73 for the conducting elements, disposed alongside the protuberance 23.

Figure 5:
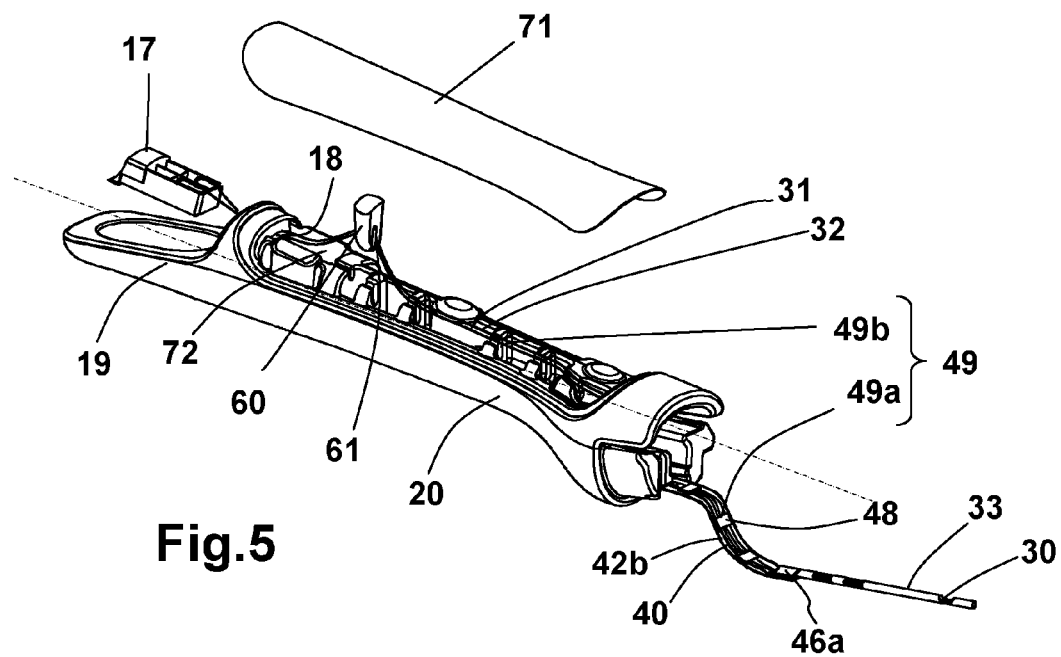
FIG. 5 illustrates an exploded perspective view of the handle subassembly of FIG. 2.
Figure 6:
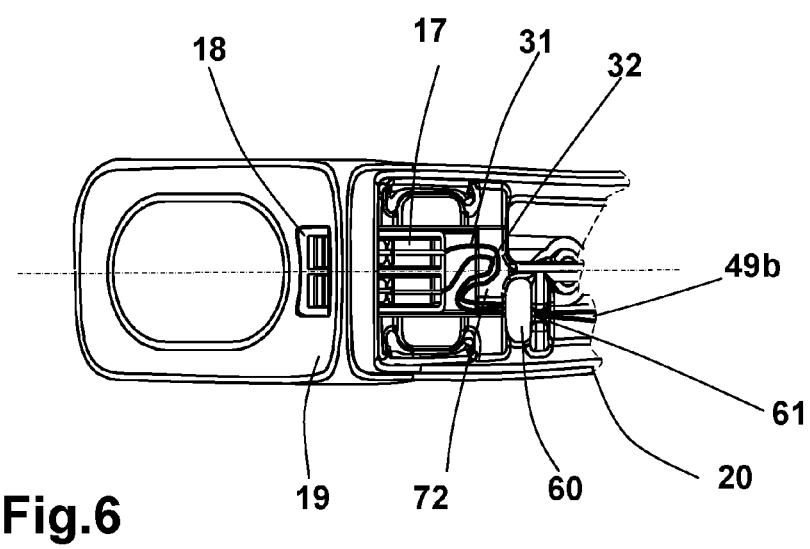
FIG. 6 illustrates a detailed top view of the free end of the handle without the cover of the handle subassembly of FIG. 2.

According to FIGS. 5 and 6, a braking device 60 for the conducting elements 31, 32 is disposed in the handle 20. The braking device is formed by a silicone stop 60 that has a slot 61. The conducting elements 31, 32 are positioned inside the slot 61, which is oriented in the longitudinal direction. The conducting elements 31, 32 are connected to a connector 17 of the control circuit 28. The handle 20 has a free end 19 equipped with an opening 18 which extends in the longitudinal direction. The connector 17 is disposed in the opening 18. The handle 20 comprises a receiving housing 72 for a residual part of the conducting elements 31, 32, which form at least one loop. The receiving housing 72 is disposed between the silicone stop 60 and the connector 17. The opening 18 opens into the receiving housing 72.

A cover 71 is mounted on the handle 20. The cover 71 covers the part 49b of the receiving area 49 for the conducting elements 31, 32, the receiving housing 72 of the residual part of the conducting elements 31, 32, and the silicone stop 60.

The cooking vessel 1 comprises two subassemblies, which can be produced independently and joined in a final assembly operation. A first subassembly, called the handle subassembly, is formed by the handle 20 equipped with the receiving housing 22 for the lug 6, the support 40, the conducting elements 31, 32, and the sensor 30 equipped with its tubular sheath 33. A second subassembly called the body subassembly is formed by the body 2 equipped with the lug 6, the receiving housing 11 for the sensor 30, and the groove 5.

The method for assembling the handle subassembly comprises the following steps:
  Mounting the sensor 30 equipped with the conducting elements 31, 32 inside the tubular sheath 33 and connecting the conducting elements 31, 32 to the connector 17;
  Feeding the tubular sheath 33 into the opening 18 at the free end 19 of the handle 20, then feeding the tubular sheath 33 into the conduit 70;
  Inserting the conducting elements 31, 32 into the slot 61 of the silicone stop 60, then positioning the silicone stop 60 inside the handle 20;
  Pre-positioning the conducting elements 31, 32 in the part 49a of the receiving area 49 and in the receiving housing 72, a part of the conducting elements 31, 32 and the connector 17 extending beyond the opening 18 and a part of the conducting elements 31, 32 and the tubular sheath extending beyond the conduit 70, then mounting the cover 71 on the handle 20, particularly by gluing.

At this stage of the assembly, a standard handle pre-subassembly for a family of cooking vessels may be considered to have been produced.

To finish the handle subassembly, the assembly method comprises the following steps:
  Feeding the tubular sheath through the perforation 57 of the support 40 (FIG. 4) and inserting the mounting part 41 into the receptacle 29 of the handle 20;
  Forcibly inserting the tubular sheath 33 into the receiving housing 47 so as to mount the sensor 30 on the support 40;
  Arranging the conducting elements 31, 32 in the retaining part 42b and folding the tabs 48 to form the part 49a of the receiving area 49;
  Tensioning the conducting elements 31, 32 inside the receiving area 49 by exerting traction on the connector 17 and/or on the conducting elements 31, 32, the braking device formed by the stop 60 allowing the conducting elements to move in the direction of the traction, the receiving area 49 being formed by the part 49b in the handle 20 and by the part 49a in the support 40;
  Inserting the connector 17 into the opening 18 and the residual part of the conducting elements 31, 32 into the receiving housing 72 of the handle 20, the residual part of the conducting elements 31, 32 forming at least one loop, the braking device then preventing the conducting elements 31, 32 from moving in the direction opposite the direction of the traction during the formation of the loop.

During the final assembly operation, the housing 22 of the handle 20 is mounted so as to be tightly fitted onto the lug 6 and the tubular sheath 33 is inserted so as to be tightly fitted into the receiving housing 11. During this operation, the programmed deformation areas 50, 55a, 55b make it possible to accommodate the dimensional tolerances of the two subassemblies.

Of course, the invention is not in any way limited to the embodiments described and illustrated, which have been given only as examples. Modifications are still possible, particularly from the point of view of the composition of the various elements or the substitution of technical equivalents, without going beyond the scope of protection of the invention.

Thus, in a variant of embodiment, the braking device comprises a fixed part belonging to the handle and a part that is movable in opposition to an elastic return means, the conducting element being disposed between the fixed part and the moving part. The elastic return means can be formed, for example, by a spring.

The invention claimed is:

1. A method for producing a handle subassembly made to be mounted to a body to form a cooking vessel, said subassembly comprising a handle, a sensor, equipped with at least one flexible insulated conducting element which is connected to a connector of a control circuit, said subassembly comprising a receiving area for the conducting element a part of which is disposed in the handle, wherein the method successively comprises the following steps:
  a) Positioning and tensioning the conducting element inside the receiving area by exerting traction on at least one of the connector and the conducting element after having placed said conducting element in a braking device disposed in the handle, which braking device allows the conducting element to move in a direction of the traction when a tractive force exceeds a predetermined threshold, and
  b) Inserting at least one of the connector and the conducting element into the handle, the handle comprising a receiving housing in which a residual part of the conducting element is disposed so as to form at least one loop, the braking device then preventing the conducting element from moving in a direction opposite the direction of the traction during formation of the loop.

2. The method for producing the handle subassembly according to claim 1, wherein the braking device comprises a silicone stop equipped with a slot, the conducting element being disposed in the slot.

3. The method for producing the handle subassembly according to claim 2, wherein the handle extends in a longitudinal direction, the part of the receiving area for the conducting element disposed in the handle extending substantially in the longitudinal direction and the slot being aligned with the part, and wherein the tractive force on the conducting element exerted in step a) is applied in the longitudinal direction.

4. The method for producing the handle subassembly according to claim 3, wherein a force for pushing the residual part of the conducting element into the receiving housing is applied in the longitudinal direction.

5. The method for producing the handle subassembly according to claim 4, wherein the handle has a free end which comprises an opening for receiving the connector, the connector being mounted in the longitudinal direction so as to push the residual part of the conducting element into the receiving housing.

6. The method for producing the handle subassembly according to claim 1, wherein the handle includes a cover and wherein the method includes the following step prior to step a):
   c) Attaching the cover to the handle, said cover at least one of closing the part of the receiving area for the conducting element disposed in the handle and maintaining the braking device in position.

7. The method for producing the handle subassembly according to claim 1, wherein the handle subassembly includes a support comprising a first end mounted to the handle and a second end to which the sensor is mounted, the support forming a part of the receiving area for the conducting element, and wherein the method includes the following steps prior to step a):
   placing the support on the handle;
   placing the sensor on the support; and
   arranging the conducting element in the part of the receiving area.

8. The method for producing the handle subassembly according to claim 7, wherein the sensor and a part of the conducting element are encapsulated in a tubular metal sheath, the support comprising two tabs (46a, 46b) forming a receiving housing for the tubular sheath, and wherein the method includes, in the step for placing the sensor on the support, an operation for forcibly inserting the tubular sheath into the receiving housing, the two mounting tabs (46a, 46b) having a spring effect that retains the tubular sheath on the support.

9. The method for producing the handle subassembly according to claim 7, wherein the part of the receiving area for the conducting element is formed by a part (42b) for retaining the conducting element having a substantially constant cross-section, particularly in the shape of a flattened U, and by tabs for retaining the conducting element, and in that it includes, in the step for arranging the conducting elements in the part of the receiving area, an operation for folding the tabs so as to close the U shape and form the part of the receiving area.

10. The method of claim 1, wherein the sensor is a temperature sensor.

11. A handle subassembly made to be mounted to a body to form a cooking vessel, said subassembly comprising a handle, a sensor, equipped with at least one flexible insulated conducting element which is connected to a connector of a control circuit, said subassembly comprising a receiving area for the conducting element, a part of which is disposed in the handle,
   wherein a braking device is disposed in the handle with the conducting element extending through the braking device, and
   wherein the handle has a receiving housing in which a portion of the conducting element is disposed so as to form at least one loop between the connector and the braking device.

12. The handle subassembly of claim 11, wherein the sensor is a temperature sensor.

13. The handle subassembly of claim 11, wherein the braking device is configured to allow the conducting element to move in response to a tractive force on at least one of the connector and the conducting element when the tractive force exceeds a predetermined threshold.

14. The handle subassembly of claim 13, wherein the braking device prevents the conducting element from moving in a direction opposite to the tractive force during formation of the loop.

15. The handle subassembly of claim 11, wherein the braking device comprises a silicone stop having a slot, the conducting element being disposed in the slot.

16. A cooking vessel comprising a handle subassembly mounted to a body, said subassembly comprising a handle, a sensor, particularly a temperature sensor, equipped with at least one flexible insulated conducting element which is connected to a connector of a control circuit, said subassembly comprising a receiving area for the conducting element, a part of which is disposed in the handle, said body comprising a lateral wall and a bottom in which is disposed a receiving housing for the sensor, the handle being mounted to the body by mounting means, wherein a braking device is disposed in the handle with the conducting element extending through the braking device, and
   wherein the handle has a receiving housing in which a portion of the conducting element is disposed so as to form at least one loop between the connector and the braking device.

17. The cooking vessel of claim 16, wherein the sensor is a temperature sensor.

* * * * *